United States Patent [19]

Hamilton

[11] 4,160,444
[45] Jul. 10, 1979

[54] OMNIDIRECTIONAL HEAT PIPE

[76] Inventor: Ralph A. Hamilton, 1836 Lake St., Glendale, Calif. 91201

[21] Appl. No.: 818,106

[22] Filed: Jul. 22, 1977

[51] Int. Cl.$^2$ ............................................. F24J 3/02
[52] U.S. Cl. .................................. 126/271; 165/105; 237/1 A; 165/104 S; 122/33
[58] Field of Search ......................... 165/105; 122/33; 237/1 A, 67; 62/333; 126/271

[56] References Cited

U.S. PATENT DOCUMENTS

| | | | |
|---|---|---|---|
| 2,068,549 | 1/1937 | Knight | 237/59 X |
| 2,280,273 | 4/1942 | Taylor | 62/333 X |
| 2,366,955 | 1/1945 | Burggrabe | 62/333 X |
| 4,061,131 | 12/1977 | Bohanon | 165/105 X |

*Primary Examiner*—Albert W. Davis, Jr.
*Attorney, Agent, or Firm*—Ralph M. Flygare

[57] ABSTRACT

A wickless heat pipe assembly comprising a pair of conduits each having a vaporization region at one end and a condensing region at the other. The vaporization regions are configured to prevent the heat-transferring fluid, while in liquid form, from flowing downwardly into their respective conduits. A pair of liquid return passages connect each condensing region with the vaporization region of the opposite conduit through a check valve. Cyclically alternating changes in pressure in the two conduits are produced by alternately applying heat to the two vaporization regions. The pressure differentials cause any liquid collected at the condensing region to be returned to the vaporization region. This positive pumping action of the heat transfer fluid permits the heat pipe assembly to operate in almost any attitude and is particularly suitable for the downward transfer of heat.

7 Claims, 9 Drawing Figures

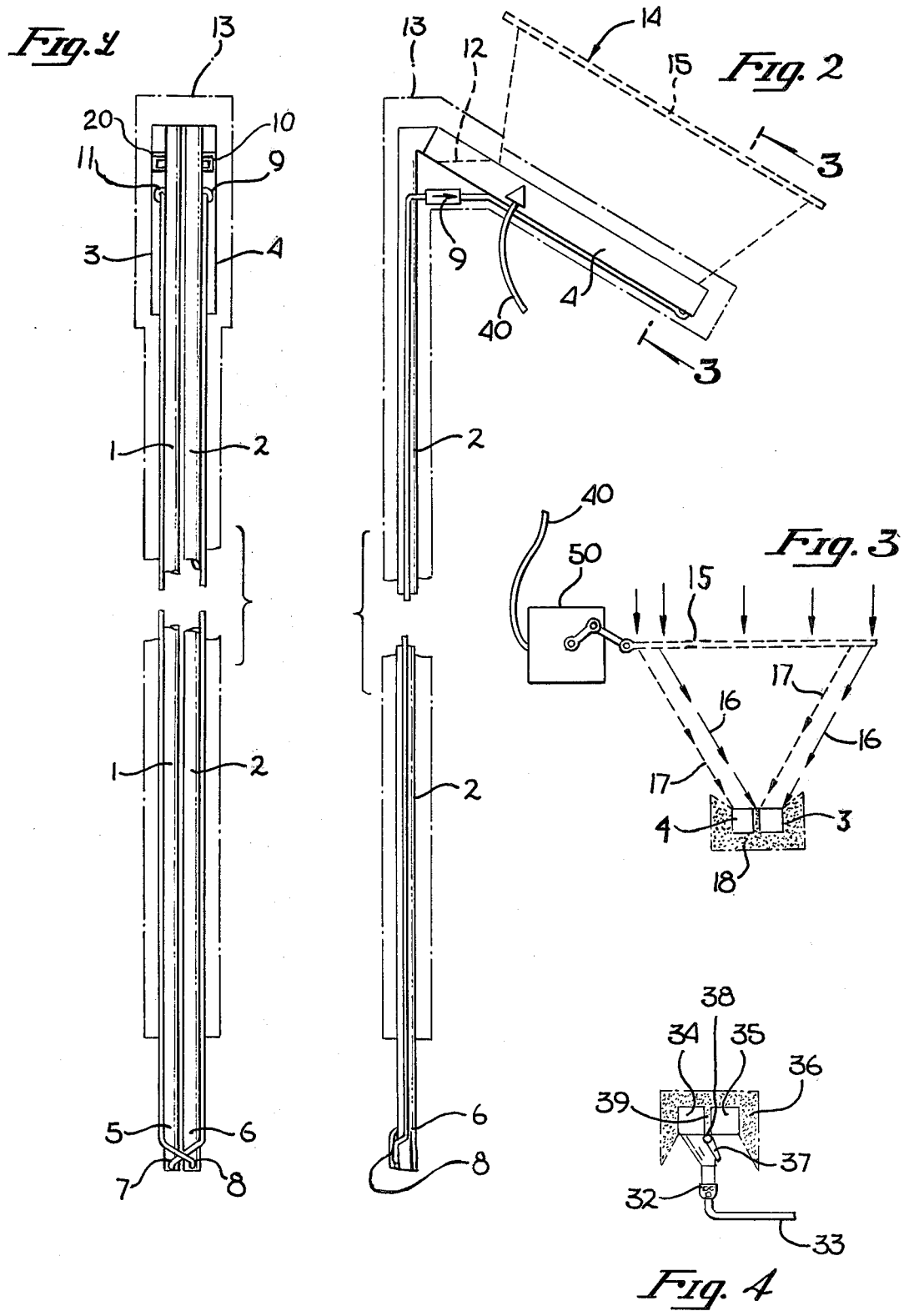

OMNIDIRECTIONAL HEAT PIPE

BACKGROUND OF THE INVENTION

1. Field of the Invention

This invention resides, broadly, in the field of thermal energy transfer systems, and more particularly relates to a heat pipe which is capable of efficiently transferring heat downwardly. Heat pipes, as a class of thermal energy transfer devices, comprise closed and sealed chambers containing a liquid that absorbs heat from an input source. The liquid is vaporized by the input heat, creating pressure, and these vapors will move to a cooler and therefore lower pressure portion of the chamber where they give up their latent heat of vaporization and recondenses into a liquid. The liquid condensate is returned to the heat-input region where it is re-vaporized to continue the cycle. The continuous migration of the vapor and fluid results in transfer of heat from the input to the output ends of the heat pipe.

2. Description of the Prior Art

Heretofore, most heat pipes utilized capillary action of a wicking material, lining the interior of the heat pipe, to return the liquid condensate to the vaporization region. While such an arrangement is several orders of magnitude more effective than thermal conduction in a metallic solid, it suffers considerable loss by reason of the thermal insulating qualities of the wicking material. Furthermore, the capillary action is not as efficient in transferring the condensate upwardly as it is in transferring downwardly. It is well known to those versed in the art that the greatest loss in heat pipe efficiency occurs when transferring heat downwardly because of the difficulty of returning the condensate upwardly by capillarity.

Typical heat pipes of the prior art are disclosed in U.S. Pat. Nos. 2,350,341 and 2,350,348 to R. S. Gaugler, and 3,606,005 to R. D. Moore, Jr. The latter patent discloses a heat pipe assembly comprising an end-to-end series of short heat pipes, requiring that the liquid in each pipe section need be lifted by capillarity only a relatively short distance. Moore states that an arrangement of ten segments "has from 10 to 100 times the maximum heat flux capacity of an unsegmented heat pipe of the same cross section and length." Nevertheless, this arrangement still suffers the loss of effectiveness attributable to the thermal insulating qualities of wicking material and the slow rate of liquid transfer that is characteristic of capillary devices. Also, the effects of attitude greatly influence the effectiveness of all known prior heat pipes. To overcome the insulating qualities of most wicking materials, some attempts have been made to use metallic wicks. However, such structure still has the serious shortcoming of very slow liquid transfer rate and practical limitations as to the distance of liquid transfer.

An exemplary commercial heat pipe of the wick-return type having a length of 15 centimeters, is rated to have an upward heat transfer capacity of 6,000 watts and a downward heat transfer capacity of 500 watts. Thus, only 8.3% as much heat can be transferred downwardly as can be transferred upwardly by such a device.

There exists many important applications requiring thermal energy transfer in a downward direction, thus precluding the effective use of prior heat pipe devices. For example, the collection of solar heat on the roof of a building requires the transfer of that heat downward to storage or utilization areas.

SUMMARY OF THE INVENTION

Briefly, the principal feature of the present invention is the utilization of a cyclically-operated positive-pressure system for the transfer of vapor and condensate between the input and output ends of the heat pipe. The device does not employ capillarity as the liquid-transfer mechanism, thus avoiding the undesirable properties of wicking materials, and permitting omni-directional operation. Liquid condensate return is accomplished by the use of a parallel pair of heat pipes having a unidirectional cross-coupling therebetween. Although hereinafter described in terms of a pair of individual heat pipes, the overall assembly is essentially the functional equivalent of a single integral heat pipe of the prior art. The first heat pipe has a liquid return line connected from its heat-output terminus to the heat-input terminus of the other heat pipe. A check valve constrains the flow in one direction. The remaining heat pipe is similarly configured. Cyclically alternating changes in pressure within the overall system, obtained by alternately applying heat from the source to the two inputs, causes a pumping action which returns the condensate from first one and then the other of the two output ends of the system back to their respective input ends.

Since positive liquid pressure is employed, there is no need for wicking materials. The geometry of the input terminus or vaporization chamber of each heat pipe of the pair comprising the assembly, allows vapor to move from the input end towards the output end, but prevents liquid from following a like path.

The two heat pipes may be partially evacuated and sealed, and are physically separate except for the small interconnecting cross-over return lines and their respective check valves. Evacuation allows the liquid to vaporize at a lower temperature. Upon heating the first vaporization chamber (input end of the system) the resultant internal pressure will force any condensate liquid in the condensing chamber of that first heat pipe back through the return line into the vaporization chamber of the second heat pipe. During this pumping operation, the heated vapor will carry latent heat to all portions of that pipe assembly and will give up the latent heat of vaporization to the pipe walls. When sufficient liquid has been returned to the vaporization chamber of the second heat pipe, the heat source is removed from the first vaporization chamber and applied to the second vaporization chamber. The operation then proceeds in the manner just described. The cycling rate is determined by the time required to accumulate sufficient liquid in the appropriate vaporization chamber to develop pumping pressure. As in the case of conventional heat pipes, the overall assembly is essentially isothermal, except where heat is removed.

By appropriately insulating the intermediate portions of the heat pipe, heat may be applied at one end and extracted from the other. In a practical construction the heat-pipe assembly of the present invention has the capability of efficiently transfering heat straight downward over a distance of more than 300 Meters.

It should be understood that while the invention is particularly well suited to the downward transfer of heat, it is also suitable for use in any attitude where there is a gravity field. When desired for use in transferring heat upwardly, gravity is effective for returning the condensate; when transferring heat downwardly, the pressure differential pumping action becomes effective.

It is therefore, a principle object of the invention to provide a novel and improved wickless heat pipe.

Another object of the invention is to provide a novel and improved omni-directional heat pipe.

Another object of the invention is to provide a heat pipe that will transfer heat only in the desired direction and prevent the transfer of this heat in the reverse direction.

Yet another object is to provide a heat pipe utilizing an alternating positive pressure cycle to return condensate liquid to the heat input region from the heat output region of the device.

Still another object of the invention is to provide a heat pipe having improved characteristics as compared with generally similar devices of the prior art.

These and other objects of the invention will become apparent upon consideration of the drawings and specification which follow.

BRIEF DESCRIPTION OF THE DRAWINGS

In describing the present invention, reference will be made to the accompanying Figures of the drawings in which:

FIG. 1 is a front elevation view of a heat pipe assembly constructed in accordance with the invention.

FIG. 2 is a side elevation of the device of FIG. 1.

FIG. 3 is a cross-sectional view taken along line 3—3 of FIG. 2.

FIG. 4 is a cross-sectional view illustrating an alternate embodiment of the apparatus of FIG. 3.

DESCRIPTION OF THE PREFERRED EMBODIMENT

Figure 5:
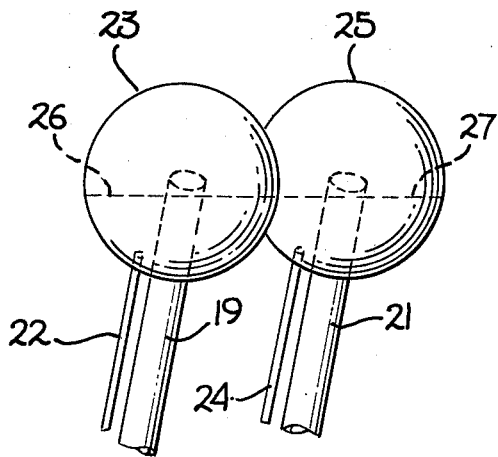
FIG. 5 is an alternate embodiment of a vaporization chamber suitable for use in the invention.

Referring to FIG. 1 there is shown a first embodiment of the invention, which, by way of illustrating, is incorporated into a solar heating system. As in the case of all heat pipes it is desired to transfer heat from a heat source to a distant region where it is either stored or otherwise utilized. By the term "heat pipe" is meant apparatus comprising an hermetically sealed chamber partially filled with a normally-liquid fluid, with the remaining major portion being filled with a vapor of this liquid. As one end of one chamber is heated, the liquid begins to vaporize and a resulting pressure is built up in this chamber. The latent heat of vaporization is then carried throughout the chamber because of differences in pressure, and the chamber tends to become almost isothermal. This pressure is important not only because it is the cause of essentially uniform heat transfer, but also because it regulates the temperature of vaporization and liquification. Means must be provided to collect any condensate liquid and return it to the region of heat input where it may be revaporized.

In the present invention the pressure developed by the vaporization of the heat transfer fluid is used to force liquified heat-transfer fluid upward against the force of gravity in order to return it to the heat source region for revaporization. The process is cyclically but automatically repetitive, thereby resulting in an essentially continuous downward transfer of thermal energy from an elevated heat source to a lower heat extraction point. It should be understood that the embodiment of FIG. 2, wherein the invention is incorporated into a solar heating system, is by way of example only, since the input source of heat may be obtained from other than direct solar radiation, as is the case of those embodiments to be described in connection with FIGS. 4 et seq. Referring to FIG. 1 there is shown two hollow elongated conduits 1 and 2, disposed in a generally vertical position. Preferably these conduits are made from metal and have a wall thickness sufficient to withstand the internal pressures developed during operation of the apparatus. The upper portions 3 and 4 of conduits 1 and 2 have the form of an inverted V, somewhat resembling a siphon, as can be seen best in FIG. 2. The short depending portions 3 and 4 comprise liquid reservoirs and also comprise the heat input ends of the apparatus. The lower ends 5 and 6 of conduits 1 and 2, respectively, are closed except for return lines 7 and 8. Ends 5 and 6 comprise the thermal output ends of the apparatus. It is preferred that at least upper portions 3 and 4, and ends 5 and 6, of conduits 1 and 2, be made from a material (e.g., metal) having a high thermal conductivity. Liquid return line 7 interconnects end 5 of conduit 1 with upper portion 4 of conduit 2 through a check valve 9. Similarly, liquid return line 8 interconnects end 6 with upper portion 3 via check valve 11. Fluid flow through check valve 9 and 11 is from ends 5 and 6, respectively, towards upper portions 4 and 3, respectively. The apparatus described thus far (elements 1–11) comprises a closed sealed system. This is partially filled with a heat-transfer fluid 12. Normally, the heat-transfer fluid 12 is in a liquid state and prior to start up of the system, a portion of this liquid must be disposed in one or the other, or both, of the upper reservoir portions 3 and 4 of the apparatus. An external insulating housing 13 envelops all but the output ends 5 and 6, and the input portions 3 and 4 of the apparatus. This insulating housing prevents unwanted loss of heat between the input and output regions of the system and may comprise any suitable and well known thermal insulation.

A heat source is required to supply thermal energy to the input end of the system. In this instance, the heat source comprises a solar energy collector 15 indicated generally at 14. Collector 14 comprises a rectangular Fresnel lens 15 for concentrating incoming radiant energy from the sun onto the uninsulated upper portions 3 and 4 of the system.

Schematically indicated at 10 and 20 of FIGS. 1 and 2 are two liquid level sensors. The signals from these sensors, through electric lines 40, control the operation of servo motor 50 to move lens 15 when sufficient liquid has been vaporized from either reservoir 3 or reservoir 4. Other methods of shifting the solar heat from conduits 3 to 4 and back again may be used, as will be obvious to those versed in the art. In many cases a sun follower mirror is used (not shown) to reflect the sun light into lens 15 and it will be obvious that a slight cyclical shifting of this sun follower influenced by the sensors 10 or 20 would shift the heat between reservoirs 3 and 4 as required for continuous operation of the system.

As mentioned previously, the basic objective of a heat pipe is to collect heat at the input end and efficiently transfer it to the opposite end where it may be extracted for use. It is also required that when once transferred, and the heat source extinguished, that this heat not be transferred in the opposite direction where it may be dissipated. The heat transfer medium comprises a fluid which is vaporized by the input heat. In certain instances, the heat transfer medium initially may be in solid form after which it is liquified to commence the operational cycle. Vaporization causes a pressure buildup in the pipe. A pressure gradient in the pipe causes the vapor carrying its latent heat of vaporization to be moved to all parts of the pipe; thus, the pipe becomes almost isothermal. In addition to causing the isothermal effect, the pressure existing along the pipe also controls the temperature of vaporization and reliquifaction of the heat transfer fluid. In the present invention, the pressure differential from end-to-end along the pipe is also used to force condensate at the output end of the system, against the force of gravity, back to the input end of the system where it may be revaporized to commence another heat transfer cycle. The term "system" as used herein, means the pair of conduits 1 and 2, the crossover return lines 7 and 8, and all other necessary appurtenances.

As can be seen, the system uses two side-by-side pipes arranged such that when the pressure is higher in one than in the other, the condensate liquid will be forced from the lower end of the pipe having the highest pressure upwards into the reservoir of the pipe having the lowest pressure. Once the condensate has been returned to the low-pressure reservoir, heat must be applied to the returned liquid to commence the next cycle of operation. Thus, by alternately heating first one and then the other of the upper ends of the system, a continuous vaporization—heat—transfer—condensation—and return cycle will be maintained. Check valves 9 and 11 prevent return of liquid from the upper ends of their respective pipes to the lower ends thereof. Only vaporized fluid may be transferred in the downward direction.

FIG. 3 illustrates how the Fresnel lens 15 and collector 14 assembly may be shifted back and forth from one pipe to the other in a cyclical manner for the purpose of heating only one of the pipes (1 or 2) at a time. The initial position is shown by solid lines 16, in which case upper portion 3 of conduit 1 will be heated by irradiation. The alternate position is shown by dotted lines 17 whereby the upper portion 4 of conduit 2 will be heated. Thermal insulation 18 confines the input thermal energy to the input ends of the system. Any suitable means, not shown in FIG. 3, may be used to shift the collector 14 from side-to-side for alternately heating the two input portions 3 and 4, respectively.

The liquid confined within the system may comprise water, liquid metal, liquified refrigerant, or other fluid having the requisite boiling point, vaporization pressure, specific heat, etc. Conduits 1 and 2 may be round, square, rectangular, or of any other desired cross-section.

Summarizing the sequence of the operating cycle, liquid heated in, say, upper portion 3, vaporizes and carries its latent heat of vaporization throughout the length of conduit 1. Insulation 13 confines this heat within the system until it reaches the uninsulated region at end 5. The wall of the conduit 1 at end 5 is relatively cool (by radiation) and upon contact with the cooler wall, the vapor will condense into a liquid. This action results in the giving up to radiation of the latent heat of vaporization. By the force of gravity the liquid condensate will tend to collect at 5 at the low end of conduit 1. Continued heat input to the upper end of conduit 1 (at 3) will develop sufficient pressure within conduit 1 to force the collected condensate at the lower end 5 and through return line 7 back up to the reservoir portion 4 of the alternate conduit, via check valve 9. With no heat applied to conduit 2 (upper end 4) it will either drop sufficiently in temperature, or shortly thereafter the heated upper end 3 of conduit 1 will become hotter than reservoir 4. As a consequence, reservoir 4 will obtain a lower internal pressure than conduit 1. When this differential pressure in conduit 1 is slightly higher than that required to lift the operating head of the liquid, the condensate will be forced from the lower end 5 upwardly and into reservoir 4 of conduit 2. This process can be continued until very little liquid remains in the reservoir portion (3) of the first conduit 1; however, anytime following this, heat applied to the reservoir portion (4) will cause a similar sequence of events in the conduit 2.

It is only necessary that some liquid be present in the reservoir (upper portion) of the conduit to which the input thermal energy is applied.

When the differential pressure in one conduit becomes sufficiently greater than that in the other conduit, the heat-transfer liquid will be forced through the appropriate return line back to the input end of the other conduit. This completes one cycle of operation of the system and a new cycle may be started when the input heat is applied to the other conduit input end. This cyclical operation may be continued as long as heat is alternately applied to the two input ends of the system. Preferably the heat input to each conduit is of equal duration, and is not critical as to length except that there must be some returned liquid for vaporization. The intended function of the system is that heat applied to the input (upper) end of the system may be extracted from the output (lower) end of the system—a condition not naturally expected in simple thermal energy transfer systems.

This closed system is highly efficient, particularly as compared with conventional heat pipes since there is no thermal loss due to wicking insulation or loss due to the several separator members of a segmented type of heat pipe. In a practical construction of the present invention, using water as the vaporizable heat transfer medium, thermal energy can be efficiently transferred downward for more than four hundred meters. In a conventional heat pipe of the wicking type, downward heat transfer is typically only 8.3% as efficient as when transferring heat upward, even when the distance covered is only 15 centimeters. By way of contrast, the present invention will transfer heat downward with an efficiency of better than 90% of the reverse efficiency.

The embodiment described in connection with FIGS. 1-3 is intended for transferring heat downwardly and to this end employs the inverted V-shape or siphon configuration of the upper end of the conduits to prevent liquid from flowing by gravity from the reservoir region into the lower end of each conduit. That is, the "gooseneck" arrangement keeps the liquid level approximately as shown at 12. The device will continue to function at other than the vertical attitude shown so long as some liquid is permitted to be accumulated in the upper reservoir region (e.g., 3 or 4). This embodiment is, then, essentially unidirectional in the downward direction, acting in effect as a heat "check valve", and preventing upward transfer of heat from the storage tank.

Figure 6:
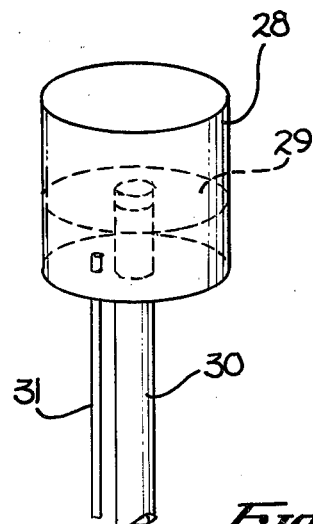
FIG. 6 is another embodiment of the device of FIG. 5.

If it is desired to have a system that is suitable for operation in any attitude, then the reservoir arrangement of FIGS. 5 or 6 may be employed. As can be seen in the embodiment of FIG. 5, conduit 19 has its open end located at the center of spherical reservoir 23. The conduit 19 passes through the wall of reservoir 23 and is sealed thereto in order to maintain the pressure-tight integrity of the system. Shown also in FIG. 5 are two condensate return lines 22 and 24, placed alongside conduits 19 and 21, respectively. These return lines are cross-over lines and serve the same function as lines 7 and 8 of the apparatus of FIG. 1. Adjacent conduit 21 is similarly provided with an enclosing spherical reservoir 25 having its center coextant with the open end of the conduit 21. The normal level of the liquid in the reservoirs 23 and 25 is just below the centerlines thereof, as indicated at 26 and 27, respectively. Thus, even in the inverted position of the system, the liquid normally remains within the reservoir.

As in the previously described embodiment, the reservoir may be made from metal or other suitable material capable of being heated by the thermal energy input source, and also capable of withstanding the normal working pressure of the system.

If desired, the spherical reservoirs of the embodiment of FIG. 5 may have a cylindrical shape, as shown at 28 in FIG. 6. Other geometry may also be used, it only being necessary that the arrangement preclude unwanted flow of liquid 29 into the open end of centrally-disposed conduit 30.

If the apparatus of FIGS. 5 and 6 is operated by placing the thermal input (reservoir) end of the system below the thermal output (extraction) end of the system, then the return of the liquified condensate to the reservoir will be affected by gravity rather than the positive pumping action of the differential pressure across the ends of the return lines. However, the functional utility of the system remains the same since the device will be essentially isothermal from end to end during operation except for the localized regions of thermal input and thermal output. Thus, there has been described a truly omni-directional heat pipe device.

It should be noted that thermal energy is transferred only from the vaporization reservoirs to the condensing reservoirs, and that little or no liquid condensate is allowed to accumulate in the condensing areas. This is to prevent unwanted retransfer of that heat out of the condenser areas during a period when no heat is being applied to the vaporization areas and when the condensing areas remain hot or warm. As there is a small amount or no liquid left in the heat output end of the system, no liquid could be vaporized at this end and therefore no reverse transfer would be possible.

The apparatus specifically causes transfer in one direction only, and acts like a "heat check valve" in the opposite direction.

There is shown in FIG. 4 means for alternately heating the input ends of the apparatus of FIGS. 1-3 by means of a stationary flame source and an alternating flame deflector. This modification of the invention comprises a gas flame nozzle 32 connected via supply line 33 to any suitable gaseous fuel supply (not shown). The input ends (reservoirs) of conduits 34 and 35 are enclosed on all but one side by thermal insulation 36. Movable flame deflector 37, mounted on hinge 38 at insulating partition 39, is cyclically activated to cause first one and then the other of the two conduits 34 and 35 to be heated. Preferably, the two conduits 34 and 35 are heated for equal intervals, which intervals are of a duration sufficient to vaporize much of the liquid in the input or reservoir end of the conduit. This will assure that the desired pressure differential necessary to pump the condensate into the other conduit will be achieved. Any suitable means such as a servomotor driven deflector 37 may be used. This servo is controlled by differential pressure sensors in reservoirs 34 and 35. Liquid level sensors in reservoirs 34 and 35 may also be used to control the deflector servo (37) at appropriate times in the operating cycle.

Figure 7:
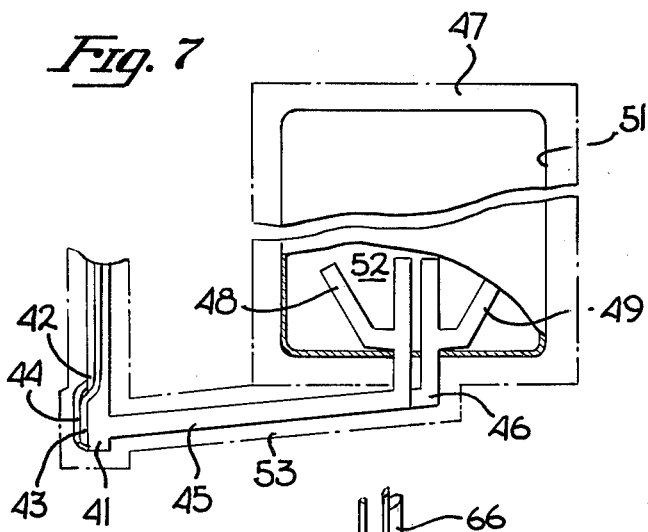
FIG. 7 is a side elevation view, partially in section and partially broken away, illustrating a modification of the apparatus of FIGS. 1 and 2, wherein a heat storage tank is added thereto.

There will now be described ancillary apparatus for extracting useful heat from the output terminus of the heat pipe system of the invention. Referring to FIG. 7 there is shown the lower ends of a pair of conduits 41 and 42, similar to conduits 5 and 6 of FIG. 1. These conduits are provided with cross-over return lines 43 and 44, respectively. Also, conduits 41 and 42 are provided with extension tubes 45 and 46, respectively, which slope gradually upward and terminate in thermal radiators 48 and 49, respectively. Tank 51 encloses radiators 48 and 49, and is provided with external thermal insulation 47. Thermal insulation 53 surrounds the conduits 41 and 42, as well as extensions 45 and 46. Tank 51 may be partially or completely filled with a heat storage medium 52 such as water, salt solution, or other material of high specific heat.

Heated vapors coming down conduits 41 and 42 continue through extensions 45 and 46 into radiators 48 and 49 where they give up their heat by convection and conduction to the medium 52 in tank 51. The vapor condenses into a liquid as its gives up its heat, and by the action of gravity this liquid runs down the inclined extensions 45 and 46 to the return lines 43 and 44. From the return lines the liquid condensate is pumped back through check valves to the input reservoir ends of the system. Heat stored in medium 52 may be used in any convenient or desired way, but cannot be transferred back upwards along the conduits 41 and 44 because the slant pipes 45 and 46, and the force of gravity, removes all liquid condensate from the hot storage tank. No vapors can be produced by the action of the heat stored in tank 51 and the heat so stored cannot be dissipated upward through the heat collector portion of the system.

Figure 8:
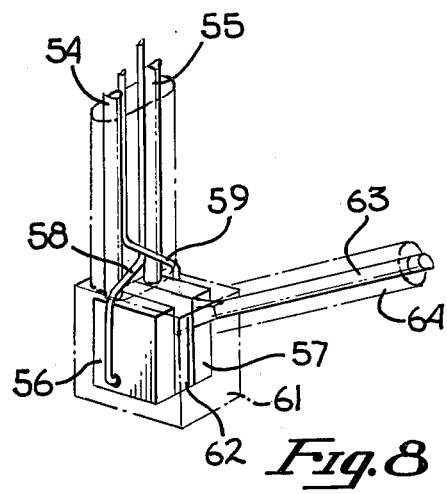
FIG. 8 is a fragmentary perspective view of the transfer portion of an alternate embodiment of the invention.

There is shown in FIG. 8 yet another embodiment of the invention in which it is not necessary to physically shift the input heat source from one vaporizing reservoir to the other in a cyclic manner. This embodiment comprises a pair of conduits 54 and 55 terminating, respectively, into chambers 56 and 57. Cross-over return lines 58 and 59 connect chambers 56 and 57 to respective vaporizing reservoirs (not shown). External thermal insulation 61 encloses the entire assembly. This arrangement causes return of the liquid condensate by a pumping action without alternately shifting the heat source between the two input or vaporizing reservoirs. This embodiment makes use of unequal and alternating heat absorption cycles to vary the pressures in the conduit assemblies (54–55) and thereby pump any condensate liquid collected in chambers 56 and 57 back via return lines 58 and 59 to the input. Chambers 56 and 57, by reason of their large surface areas allow more internal volume for the incoming vapor and more intimate contact area between chambers 56, 57 and 62. On start up, chambers 56 and 57 may be heated and pressurized before return pumping begins as a result of simultaneously heating both of the input (reservoir) ends of the system. A third flat chamber 62 is interposed between the confronting sides of chambers 56 and 57 and is in intimate thermal contact with one chamber only, either 56 or 57. This auxilliary chamber 62 is provided with a third heat-pipe conduit 63 and an insulating housing 64. This chamber 62 is filled with a heat-transfer liquid, such as water, after which the remaining volume in heat pipe 63 is partially evacuated. Conduit 63 slopes upward at a shallow angle, sufficient to permit gravity to return the condensate. The upper end of conduit 63 comprises the heat output end, and may be provided with a heat radiator or heat exchanger means such as indicated at 48–49 of FIG. 7.

Lower chamber 62 is placed in intimate thermal contact with chamber 52 so as to be heated thereby. Chamber 56 is not in contact with chamber 62 and does not apply as much heat to the chamber 62. The temperature in chamber 57 will be lower than that of chamber 56 because the heat of chamber 62 will be transmitted through the walls of chambers 57 and 62, and the water in chamber 62 will be vaporized. This action will cause heat to be conducted from chamber 57 into the output end of the system.

The temperature of chamber 57 will therefore be lower than that of chamber 56 and its attached pipe 54.

The difference in temperature in chamber 57 and chamber 56 will cause a higher pressure in chamber 56 than in chamber 57 and when sufficiently great will force the water in the lower portion of chamber 56 to be pumped into the liquid return tube 58 and up and into the vaporization chamber.

Alternately the flat chamber 62 would be moved in the direction away from chamber 57 and into intimate contact with chamber 56. This would lower the temperature and pressure in chamber 56 and would cause the liquid from chamber 57 to be pumped back up and empty into the heat or vaporization chamber (4).

This completes one cycle of absorption-actuated pumping and the system would continue to cycle as long as heat transfer is desired or input heat power is available.

Figure 9:
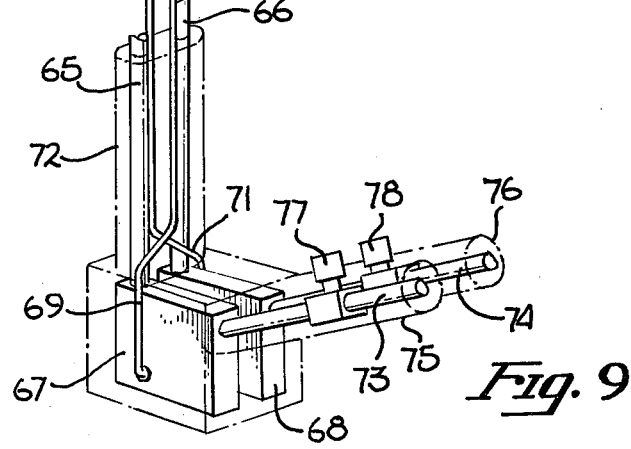
FIG. 9 is a fragmentary perspective view, similar to that of FIG. 8 but illustrating yet another embodiment of the transfer portion of the invention.

FIG. 9 is another embodiment of the heat output or lower end of the system connected to downward pipes 65 and 66. This embodiment comprises another means for causing unequal absorption of the heat brought down by pipes 65 and 66, and will cause pumping of the condensate back into vaporization chambers 3 and 4. As shown in FIG. 9, the pipes 65 and 66 terminate in condensate reservoirs 67 and 68, but in this case there is no need for chambers 67 and 68 to be of a flat configuration. They may be of any configuration that will withstand the necessary operating pressure and will hold a small amount of water or condensate.

Leading from reservoirs or chambers 67 and 68 are pipes 73 and 74. The function of pipes 73 and 74 is to carry the hot vapors on into a storage medium, such as that shown in 52 in FIG. 7. Shown also are two solenoid valves 77 and 78 (or other suitable types of valves) located in series with pipes 73 and 74, respectively. These valves 77 and 78 control the condensate pumping function in the manner to be described hereinafter. Both vaporizers (e.g., 3 and 4) are heated equally and vapors travel down pipes 65 and 66 as pressure therein is built up. Condensate begins to form in reservoirs 67 and 68. However, one valve (as for example, valve 78) is closed and the other valve 77 is open.

The vapors coming down pipe 65 are allowed to continue into reservoir 67, pipe 73, and through the open valve 77, on into the storage tank radiators (e.g., 48 of FIG. 7). By opening valve 77, the overall system comprising pipe assembly 65, chamber 67, and the radiators 48, will conduct its heat into the storage medium in the storage tank 51. This will lower the temperature of the vapors and therefore the pressure also. However, the heat in the system comprising vaporizing chamber 4, pipe 66, and reservoir 68 will be kept from entering the storage tank, and will rise and thereby cause a higher differential pressure in this latter system. This unequal pressure will cause any condensate that may have accumulated in reservoir 68 to be forced up the return pipe 71 and into the evaporator 4.

A short time later, the two valves 77 and 78 are reversed so that valve 78 is opened and valve 77 is closed; this will cause emptying of reservoir 67 back up into evaporator 3. The valve operation will be cyclically changed so as to cause repumping of the condensate back up to the evaporators 3 and 4 where it may be used over and over again.

Other modifications may be made in the construction of the invention. For example, the vaporization chambers shown slope downwardly at and angle of approximately 30° to a horizontal plane in order to adequately collect solar energy at certain latitudes and during a given season. The lens and pipes would, of necessity, need to follow the traverse of the sun to obtain optimum efficiency. However, if other than a solar heat source were to be used, the vaporization chambers would be made to rise vertically, or horizontally, as required for optimal heat pick up, so long as there is a rise at the junction between the vaporization chamber and the downward extending pipe attached thereto, capable of acting as a dam or wier to keep the liquid (water) in the vaporization chamber until it is vaporized.

It is also true that the embodiment shown in FIG. 2 would operate if the entire assembly were to be rotated clockwise (in the plane of the drawing) to any angle up to 90° and beyond.

The liquid in the system may be other than water, as for example, ammonia, Freon, or other refrigerants, as is well known to those versed in the art. Still other modifications may be made within the scope of the invention.

From the foregoing specification it will be seen that there is provided by the present invention a novel and improved dual heat pipe having equal or superior efficiency to prior heat pipes yet will transfer heat with great efficiency downwardly over greater distances than were possible heretofore, and with no additional power input except as derived from the heat source itself.

What is claimed is:

1. Thermal energy transfer apparatus comprising:
 a first elongate conduit closed at both ends and adapted to hold a liquid at a first end thereof
 a second elongate conduit closed at both ends and adapted to hold a liquid at a first end thereof
 means defining a first unidirectional fluid passage from said first end of said first conduit to the second end of said second conduit;

means defining a second unidirectional fluid passage from said first end of said second conduit to the second end of said first conduit;

a normally-liquid fluid partially filling said first ends of each of said conduits; and means for first applying heat sufficient to vaporize said fluid at said first end of said first conduit and thereafter applying said heat to said first end of said second conduit, whereby any liquid condensate of said fluid tending to accumulate at the second end of said first conduit will be transferred back via said second unidirectional passage means as a result of the differential pressure established thereacross to the first end of said second conduit and thereafter any liquid condensate tending to accumulate at the second end of said second conduit will be transferred back via said first unidirectional passage defining means as a result of the differential pressure established thereacross to the first end of said first conduit.

2. Thermal energy transfer apparatus as defined in claim 1 including:

means for continuously cyclically alternating the application of heat to said first ends of said conduits by said heat applying means.

3. Thermal energy transfer apparatus as defined in claim 1 wherein said conduits are disposed substantially vertically with said first ends being located above said second ends.

4. Thermal energy transfer apparatus as defined in claim 1 wherein each of said unidirectional passage defining means comprises:

a liquid return line with a check valve disposed in the path thereof.

5. Thermal energy transfer apparatus as defined in claim 1 wherein said heat applying means comprises:

a solar heat collector.

6. Thermal energy transfer apparatus as defined in claim 1 wherein said heat applying means comprises:

a flame heater and a cyclically actuated flame deflector for alternately applying flame to first one and then the other of said first ends of said conduits.

7. Thermal energy transfer apparatus as defined in claim 1 wherein the first ends of said conduits each include:

a closed liquid reservoir having the center of its interior located substantially at the end of its respective conduit; and means defining an opening between the end of each of said conduits and their respective reservoirs.

* * * * *